March 27, 1962  T. L. BARBEE  3,027,158
DEVICE FOR MANIPULATIVELY SUPPORTING AUTOMOBILE
RADIATORS AND LIKE ARTICLES
Original Filed Nov. 16, 1955  2 Sheets-Sheet 1

INVENTOR.
THOMAS L. BARBEE
BY
Arthur J. Robert
ATTORNEY

March 27, 1962 T. L. BARBEE 3,027,158
DEVICE FOR MANIPULATIVELY SUPPORTING AUTOMOBILE
RADIATORS AND LIKE ARTICLES
Original Filed Nov. 16, 1955 2 Sheets-Sheet 2

INVENTOR.
THOMAS L. BARBEE
BY
Arthur J. Robert
ATTORNEY

United States Patent Office 3,027,158
Patented Mar. 27, 1962

3,027,158
DEVICE FOR MANIPULATIVELY SUPPORTING
AUTOMOBILE RADIATORS AND LIKE ARTICLES
Thomas L. Barbee, 329 Zorn Ave., Louisville, Ky.
Continuation of application Ser. No. 547,137, Nov. 16,
1955. This application Nov. 20, 1959, Ser. No. 854,513
7 Claims. (Cl. 269—156)

This invention relates to devices for manipulatively supporting automobile radiators and like articles for inspection and repair purposes.

The principal objects of the invention are: to provide a device which can be manipulated to receive the radiator at the floor level, raise it to a suitably elevated work level, swing it through a substantial arc to place it over a testing tank at one side of the receiving area and otherwise position it for ready inspection and repair purposes; to provide one which can be readily adjusted to receive different sizes of radiators; to provide one upon which a radiator may be easily and quickly clamped or unclamped; to provide one which can be raised and lowered by an air jack piston which carries the dead weight of the load but which is protected from the side thrust thereof, the latter being transmitted to the cylinder of the piston.

Another object is to provide a simple and rugged structure which can be easily and quickly operated and is not readily subject to damage.

My invention resides in a device which comprises: a fluid operated jack composed of a vertically arranged cylinder and piston; and a horizontally elongate work manipulating assembly, the outer end of which carries the work article, such as a radiator, and the inner end of which is connected not only to opposite sides of the cylinder through vertically spaced rollers, which transmit the side thrust of the unbalanced weight of the assembly directly to opposite sides of the cylinder, but also to the upper end of the piston rod through vertical straps, which suspend and center the weight of the assembly (as a dead weight) upon the piston rod. With this arrangement, the piston is made to carry the dead weight of the load and yet, at the same time, is protected from the side thrust of that load by transmitting that thrust directly to the cylinder. This maintains the piston free from any binding action; hence, it can be easily and quickly raised and lowered at any point within the angle over which the manipulating assembly can be swung.

The assembly includes: a slide frame forming the inner end of the assembly; a work table with clamps at its outer end; and an intermediate extension frame extending from the outer end of the slide frame to the outer end of the assembly to connect the slide frame to the work table. The cylinder provides a fixed vertical axis at the inner end of the assembly. The extension frame provides, at its outer end, an axis which can be swung along a circular path in a vertical plane so as to occupy any position along that circular path ranging from an upright vertical position at the top of the path through a horizontal position half way downwardly along the path to a vertical depending position at the bottom of the path, this type of axis being termed herein a "vertical plane axis." The slide frame provides, between the fixed vertical axis of the cylinder and the vertical plane axis at the outer end of the extension frame, a horizontal axis about which the extension frame and the work table with its clamping means may be rotated.

It will thus be clear that a radiator mounted on the work table can be swung in a horizontal path about the fixed axis of the cylinder or rotated in a vertical path about the horizontal axis of the slide frame or rotated in a vertical, horizontal or combination path about the vertical plane axis at the outer end of the extension frame. With all of these possibilities, it may, therefore, be manipulated into almost any position conceivably required for inspection and repair purposes. Finally, the extension frame is made horizontally adjustable in length while the clamping means on the work table is made horizontally adjustable, these two adjustments serving to make possible the accommodation of a wide range of differently sized radiators on the assembly.

An embodiment of the invention is illustrated in the accompanying drawings, wherein.

Figure 1:
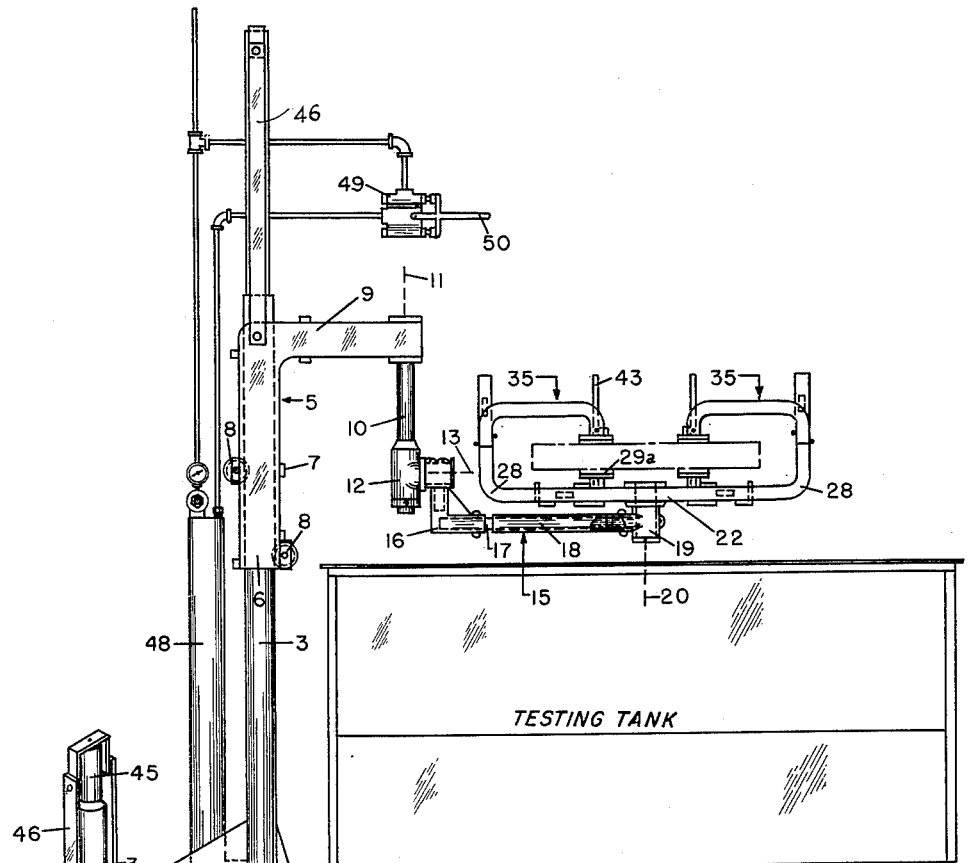
FIG. 1 is a side elevational view of the device showing its relationship to a testing tank.
Figure 2:
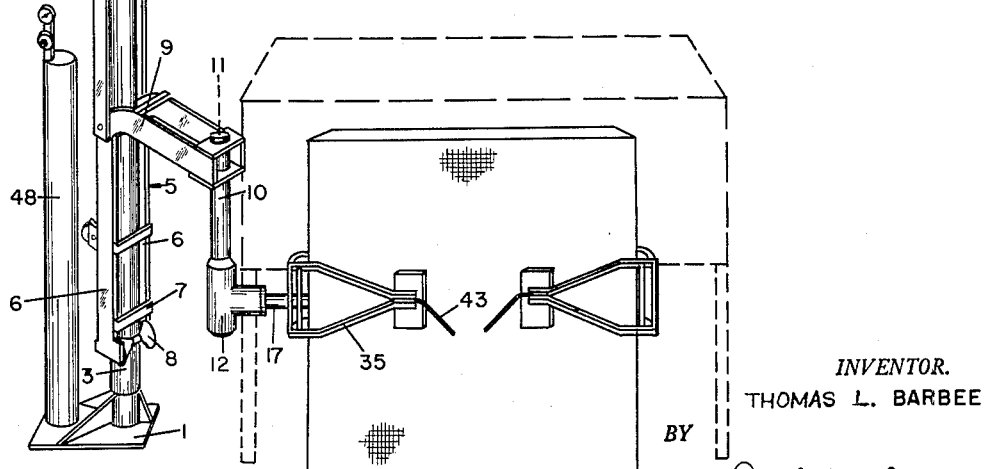
FIG. 2 is a perspective view of the device shown in FIG. 1 but omitting the cylinder operating valve and pipe connections shown in FIG. 1.
Figure 3:
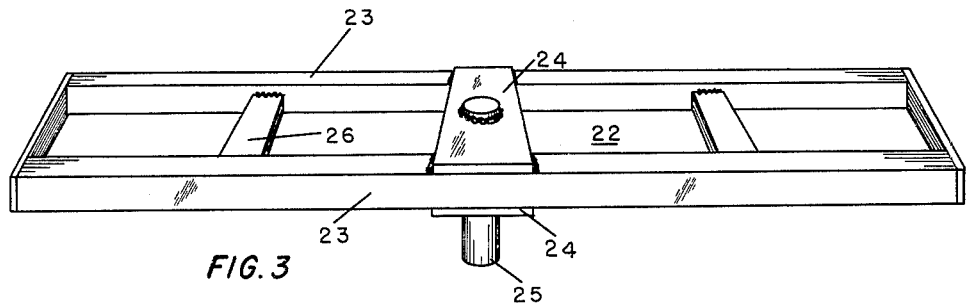
FIG. 3 is a perspective view of the work table.
Figure 4:
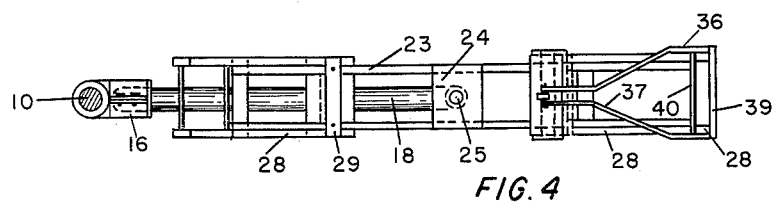
FIG. 4 is a combination horizontal sectional view through the outer end of the slide frame, and a plan view of the extension frame, the work table and the clamping means, but omitting the clamping arms on the left hand side of the table.
Figure 5:
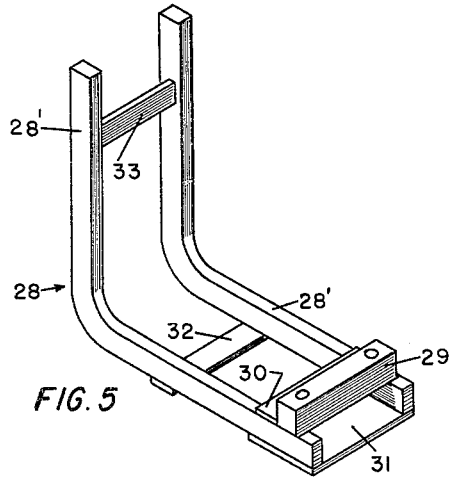
FIGS. 5 and 6 are perspective views of two separate elements of the clamping means.
Figure 6:
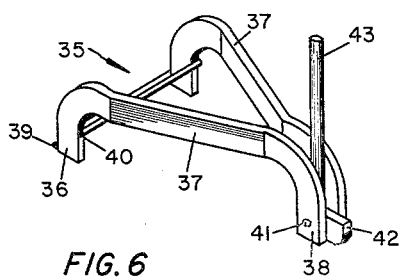

The device illustrated in the drawings includes the following elements: a base; a cylinder; a slide frame; and extension frame; a rotary work table; clamping means; the slide and extension frames, work table and clamping means cooperating to form a work manipulating assembly; a piston; and actuating means.

Base

The base is shown in the form of a simple base plate 1, which, of course, should be rigidly secured to the floor or other suitable ground frame work.

Cylinder

The cylinder 3 is vertically mounted on the base in any suitable way. It is a vertically elongate cylinder, preferably of the type conventionally used in a fluid operated or air operated jack.

Slide Frame

The slide frame 5 includes a pair of horizontally-spaced, vertically-extending elongate frame members 6 positioned along diametrically opposite sides of the cylinder 3 and slidably connected thereto for horizontal rotational movement thereabout and for vertical linear movement therealong. These frame members 6 are rigidly connected to each other by suitable cross bars 7 to form a somewhat rectangular sleeve which encircles the cylinder 3 and which can be moved rotationally about and linearly along the cylinder.

The slide frame has wheeled engagement with opposite sides of the cylinder through rollers 8, which are contoured to conform to the cylindrical shape of the cylinder 3. The rollers 8 include one located on the assembly side of said cylinder-encircling slide frame 5 and mounted on the lower end portion thereof to bear the side thrust of said assembly weight which is unbalanced in a direction tending to force the lower end of said frame horizontally in one direction against the assembly side of said cylinder. The other roller 8 is located on the opposite side of said cylinder-encircling frame and mounted thereon at a higher elevation to bear the side thrust, which tends to force the upper end of said frame horizontally in the opposite direction against said cylinder. These rollers enable the assembly to be lowered, by gravity, at any selected rate ranging from fast to slow, which is a highly desirable feature in devices of this character.

It is desirable for the slide frame 5 to be so formed that it can straddle the adjacent end wall of the testing tank, over which radiators are manipulated and into the water bath of which these radiators are submerged whenever desired. Accordingly, the slide frame, as a whole, forms an inverted U comprising: the frame members 6 which forms one leg of the U; a pair of horizontal frame members 9 which project horizontally from the upper ends of the members 6 to provide the bight of the U; and a vertical shaft member 10 which is fixedly attached to and depends vertically from the outer end of the bight 9 to form the other leg of the U. The vertical shaft member 10 rotatably carries, adjacent its lower end, a sleeve fitting 12. The sleeve fitting 12 rotates about the vertical axis 11 of the shaft 10 and includes a horizontal axis or pivot 13 for the extension frame 15.

*Extension Frame*

The extension frame 15 is a horizontally elongate frame having inner and outer ends and being connected, at its inner end, to the slide frame 5 for vertical angular movement about the horizontal axis 13. The extension frame 15 includes: a fitting 16 at its inner end; telescopic members 17 and 18; and a fitting 19 at its outer end.

The inner end fitting 16 is L-shaped. Its leg portion extends within a vertical plane at a right angle to the horizontal axis 13 and the upper end thereof is rotationally connected to the horizontal stem of the fitting 12.

The telescopic member 17 is in the form of a shaft rigidly secured to the toe end or foot portion of the inner end fitting 16. The other or outer telescopic member 18 is in the form of a hollow shaft or tube which fits telescopically over the inner telescopic member 17. Normally these two telescopic parts are secured together, by any suitable means. They may, however, be relatively extended to provide a greater overall length between the inner and outer ends of the extension frame 15 in order to accommodate larger sizes of radiators but, in whatever position they occupy, they preferably are secured together.

The outer fitting 19 is rigidly secured to the outer tubular telescopic member 18. It provides a vertical plane axis 20 for the work table. By "vertical plane axis," I mean an axis which remains in a vertical plane during all angular movements of the extension frame 15 about the horizontal axis 13 of the slide frame 5. Thus, the axis 20 may, at one time, be arranged vertically while, at another time, it may stand horizontally.

*Rotary Work Table*

The rotary work table 22 is connected to the outer end of the extension frame for rotary movement about the vertical plane axis 20 thereof. This table includes: a pair of laterally-spaced, parallel, horizontally-extending elongate bars 23; a pair of upper and lower plates 24 rigidly connecting the bars 23 together at their centers; a depending shaft 25 rigidly mounted on plates 24 for connecting the table to the vertical plane axis of the fitting 19 of the extension frame 15; and one or more cross bars 26 rigidly connecting the bars 23 together at points between their centers and their opposite ends. The end portions of the bars 23, from the center plates 24 outwardly, provide a slidable mounting for the work clamping means.

*Work Clamping Means*

The work clamping means simply functions to secure a radiator firmly to the work table 22. This clamping means comprises: a pair of L members 28, one slidably mounted on each end portion of the rotary work table 22; and a pair of clamping arms 35, one adjustably mounted on the vertical leg of each L member.

Each L member 28 is composed of a pair of spaced L-shaped bars, designated 28'. These L bars are rigidly connected together, at the toe end, by an upper cross bar 29, an upper plate 30, and a lower or bottom plate 31, and, along other portions, by a bottom foot plate 32 and a leg cross bar 33. The bar 29 functions to receive a removably mounted clamping face plate 29a, see FIG. 1. The bar 29 and the adjacent top plate 30 cooperate with the bottom plate 31 to form a slot which receives the adjacent end of the work table 22 for the purpose of slidably or adjustably mounting the L member 28 upon the work table 22.

Each clamping arm 35 comprises a pair of arms, also designated 35. Each arm 35 is of inverted shallow U-shape having an outer downwardly-turned securing end 36, a horizontally extending bight 37 and an inner downwardly-turned clamping end 38. The outer securing ends 36 are widely spaced from each other while the inner clamping ends 38 are narrowly spaced, the bight portions converging from the outer ends toward and to the inner ends. The outer securing ends 36 are rigidly connected together through a lower outer cross bar 39 and an upper inner cross bar 40 which cooperate to form a slot to receive the upper part of the L member 28 and thereby mount the clamping arm 35 adjustably or slidably thereon. The narrowly spaced clamping ends of the arms 38 are connected together through a pivot 41 which carries a cam 42 having a hand lever 43 for moving the cam 42 from a vertical non-clamping position to a horizontal clamping position.

*Work Manipulating Frame*

It will be appreciated that the slide frame 5, the extension frame 15, the work table 22, and the clamping means (provided by the L members 28 and the clamping arms 35) all cooperate to form a work manipulating frame which, as a whole, can be raised and lowered along the vertical axis of cylinder 3 and also swung horizontally about that vertical axis from a position over the testing tank to a position located at one side or the other of the tank.

Also, the extension frame 15, work table 22 and clamping means can be either swung horizontally about the vertical axis 11 of the outer leg 10 of the slide frame or rotated vertically around the horizontal axis 13 of the outer lower end of the slide frame. Furthermore, the work table 22 and the clamping means, as a whole, can be rotated around the vertical plane axis 20 at the outer end of the extension frame.

All of these movements are manually occasioned except for the raising and lowering of the manipulating frame assembly which is done through an air powered operation of the cylinder 3 and its piston.

*Fluid Operated Piston*

In this device the fluid operated piston 45 projects upwardly from the cylinder 3 with its projecting end connected to support said work manipulating frame assembly, this piston being operative, when actuated in one direction or the other, to raise or lower said assembly between top and bottom positions.

The piston 45 is connected to the work manipulating frame assembly by an inverted U-shaped strap 46, the bight of which crosses the upper end of the piston and the legs of which depend from the uppermost end of the piston downwardly along opposite sides of the air jack to their bolted connections with the upper ends of the slide frame members 6. The arrangement of the straps 46 is one permitting relative rotational movement between the straps and the cylinder 3 about the vertical axis of the cylinder.

*Actuating Means*

The actuating means comprises: a compressed air supply tank 48; a control valve 49 having an operating handle 50; and conventionally arranged connections for making the air jack operate in the conventional way. For example, when handle 50 is raised from its horizontal position, compressed air is introduced in the cylinder 3 to raise the piston 45. Conversely, when the handle 50 is pulled downwardly, air is bled from the cylinder 3 causing the piston to lower the work manipulating assembly.

*Operation*

When a radiator is to be repaired or tested, it is brought over the loading area adjacent the testing tank.

Here the work manipulating assembly is swung to a position away from the testing tank and over the loading area and handle 50 is operated to lower that assembly in position to receive the radiator. The latter is placed upon the clamping face plates 29a preferably with the clamping arms 35 removed entirely from the assembly. Thereupon each clamping arm is slipped over its L arm 28 until its clamping face plate, between cam 42 and the radiator, is pressed firmly against the upper face of the radiator. Now the cam operating lever 43 is turned from the vertical position to the horizontal position to force the radiator downwardly against the clamping face plates 29a. In doing this, there is an upward thrust on the clamping end of the clamp arm 35 causing its inner upper cross bar 40 to move outwardly against its L member 28 while the outer lower cross member 39 moves inwardly against the L member 28. In this manner, the members 39 and 40, on the downwardly turned portions 36 of each clamp arm 35, firmly and more or less rigidly grip their respective L member 28 in the article clamping position.

Now the valve 49 may be operated, through lever or handle 50, to raise the assembly to a position where it can be swung over the testing tank and there, during the repair job, that assembly may be manipulated, raised and lowered at the will of the operator.

It will be appreciated that my device has a number of advantages. Among these, the following may be mentioned: first, while the fluid operated piston carries the dead weight of the work manipulating assembly, it is not subjected to any side or horizontal thrust produced by the assembly and by the load upon it because such forces are transmitted directly to the cylinder 3 through the wheeled connection between that cylinder and the slide frame 5. Additionally this manipulating assembly may be easily and quickly manipulated to place the radiator in almost any position which serves the convenience of the workmen. Finally the clamp arms 35 are such that they can be easily and quickly removed from or positioned on the L members 28. When so positioned, they are easily slid to the clamping position and easily and quickly operated to grip the radiator in that clamping position.

It will also be appreciated: that the extension frame parts (i.e., the fitting 16, extension members 17, 18 and outer fitting 19) form a horizontally-elongate frame in the form of a transversely-shallow U having inner and outer ends; that the fitting 12 (of the inverted U formed by the slide frame parts 6, 9 and 10), provides an axis 13 passing horizontally through the outer end of the inverted U of the slide frame; that fittings 12 and 16 cooperate to provide a means connecting the inner end of the shallow U to the outer end of the inverted U for rotational movement about the horizontal axis 13 provided by the fitting 12; that the work table 22 is mounted on the outer end of the shallow U for relative rotational movement about the vertical axis thereof; and that the center of gravity of the assembly and its load will be located on or closely adjacent to a projection of the horizontal axis 13 of the connection between the U's so that the shallow U portion of the assembly and its load will remain in any position to which it may be rotated about axis 13.

This application is a continuation of my copending application Serial No. 547,137, filed Nov. 16, 1955, now abandoned.

Having described my invention, I claim:

1. A device for manipulatively supporting an article such as an automobile radiator, comprising: a base; a vertically elongate cylinder rigidly mounted at its lower end on said base; a horizontally elongate work supporting and manipulating assembly, having, at its inner end, a vertically elongate frame encircling the cylinder to connect the assembly thereto for horizontal rotational movement about and vertical linear movement along the cylinder, and having, at its outer end, means to receive and support said article, the weight of said assembly tending to cant said cylinder-encircling frame vertically on said cylinder; means providing wheeled engagement between said cylinder and said encircling frame, said means including a pair of rollers, one located on the assembly side of said cylinder-encircling frame and mounted on the lower end portion thereof to bear the side thrust of said assembly weight which tends to force the lower end of said frame horizontally in one direction against said cylinder and the other roller located on the opposite side of said cylinder-encircling frame and mounted thereon at a higher elevation to bear the side thrust, which tends to force the upper end of said frame horizontally in the opposite direction against said cylinder; a fluid operated piston mounted in said cylinder for vertical movement with its piston rod projecting from the upper end of said cylinder; means suspending the dead weight of said assembly from the projecting end of said piston rod so that said rod is operative, when said piston is actuated up and down, to raise and lower said assembly; and means for actuating said piston.

2. The device of claim 1 wherein the inner end portion of said assembly is in the form of an inverted U, comprising: the said cylinder-encircling frame, which forms the inner vertical leg of said inverted U; a horizontal frame member rigidly secured to project outwardly from the upper end portion of said encircling frame on the assembly side thereof to form the bight of said inverted U; and a vertical shaft member depending from the outer end of said bight member to form the outer leg of said inverted U.

3. The device of claim 2 wherein said assembly includes: an extension frame secured to the lower end portion of the outer leg of the U for horizontal swinging movement about the vertical axis of said leg as a center, said extension frame being horizontally adjustable in length to vary the reach of said device.

4. The device of claim 2 wherein said assembly includes: a horizontally-elongate frame forming a transversely-shallow U having inner and outer ends; and means connecting the inner end of the said shallow U to the outer end of the inverted U for rotational movement about an axis passing horizontally through said connecting means.

5. The device of claim 4 wherein said assembly includes: a work table mounted on the outer end of the shallow U for relative rotation about the vertical axis of its outer leg and for movement with the shallow U rotationally about the axis passing horizontally through said connecting means.

6. A device for manipulatively supporting an article, such as an automobile radiator, comprising: a base; a vertically elongate cylinder mounted on the base; a slide frame having a vertically elongate member extending vertically along the cylinder and slidably connected thereto for horizontal rotational movement thereabout and vertical linear movement therealong; a horizontally elongate extension frame connected at its inner end to the slide frame for angular movement about a horizontal axis and a vertical axis in the slide frame, said vertical axis being offset from the axis of said cylinder, and said extension frame having, adjacent its outer end, a vertical plane axis; a rotary work table connected to the extension frame for rotary movement about the vertical plane axis thereof; means for clamping the work upon the table; said slide frame, extension frame, work table and clamp means cooperating to form a horizontally elongate work manipulating assembly; a fluid operated piston projecting from said cylinder with its projecting end connected to support said assembly and being operative, when actuated, to raise or lower said assembly between top and bottom positions; and means for actuating said piston; said work clamping means including a pair of L-shaped members, one for each portion of the rotary work table, the foot of each L-shaped member being adjustably connected to said table, and a pair of clamping arms, one adjustably mounted on the leg of each L-shaped member, each arm including a downwardly turned outer securing end portion adjustably connected to the leg of its cooperating L-shaped member, a downwardly turned inner or clamping end portion and a horizontal bight portion connecting said end portions.

7. A device for manipulatively supporting an article, such as an automobile radiator, comprising: a base; a vertically elongate cylinder mounted on said base; a horizontally elongate work supporting and manipulating assembly slidably connected at its inner end to said cylinder for horizontal rotational movement thereabout and vertical linear movement therealong and provided at its outer end with means to receive and support said article, said assembly providing, about said cylinder, an unbalanced distribution of its weight which tends to cant its inner end vertically on said cylinder, the inner end of said assembly being provided by a slide frame which is slidably connected to said cylinder by anti-friction means including cylinder engaging elements which are vertically spaced to prevent said slide frame from being canted into a binding position on said cylinder; a fluid operated piston arranged in said cylinder for vertical movement with its piston rod projecting from the upper end of said cylinder; and means for suspending the weight of said assembly from the projecting end of said rod, said means including an inverted U-shaped strap, the bight of which is attached to the upper end of said piston rod and the depending legs of which are attached at their lower ends to said slide frame.

References Cited in the file of this patent

UNITED STATES PATENTS

| | | |
|---|---|---|
| 245,544 | Morgan | Aug. 9, 1881 |
| 455,650 | Aiken | July 7, 1891 |
| 479,468 | Shaw | July 26, 1892 |
| 517,008 | Matton | Mar. 20, 1894 |
| 1,330,318 | Hardy | Feb. 10, 1920 |
| 1,432,725 | Nolting | Oct. 17, 1922 |
| 2,567,384 | Lietz | Sept. 11, 1951 |
| 2,576,660 | Williams | Nov. 27, 1951 |
| 2,602,990 | Ferguson | July 15, 1952 |
| 2,663,929 | Carpenter | Dec. 29, 1953 |
| 2,675,609 | Miller | Apr. 20, 1954 |
| 2,679,092 | Austin | May 25, 1954 |
| 2,737,709 | Lovelace | Mar. 13, 1956 |
| 2,835,964 | Yarwood | May 27, 1958 |